United States Patent
Laib et al.

(10) Patent No.: US 7,370,831 B2
(45) Date of Patent: May 13, 2008

(54) POWER STRIP FOR SEATS

(75) Inventors: Trevor M Laib, Woodinville, WA (US); Bradley J Mitchell, Snohomish, WA (US); Kevin S Callahan, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 11/090,875

(22) Filed: Mar. 25, 2005

(65) Prior Publication Data

US 2005/0230543 A1 Oct. 20, 2005

Related U.S. Application Data

(60) Provisional application No. 60/556,823, filed on Mar. 27, 2004.

(51) Int. Cl.
*B64D 11/00* (2006.01)
(52) U.S. Cl. .............. 244/118.5; 244/122 R; 244/129.1; 174/72 B; 174/70 B; 439/210
(58) Field of Classification Search ............. 244/118.5, 244/118.6, 129.1, 122 R, 131; 439/208, 439/209, 210, 212; 174/68.2, 72 B, 71 B, 174/88 B, 70 B
See application file for complete search history.

(56) References Cited

U.S. PATENT DOCUMENTS

| | | | |
|---|---|---|---|
| 3,089,042 A * | 5/1963 | Hickey et al. .............. 307/147 |
| 4,428,078 A | 1/1984 | Kuo |
| 4,763,360 A | 8/1988 | Daniels et al. |
| 4,853,555 A | 8/1989 | Wheat |
| 6,601,798 B2 | 8/2003 | Cawley |
| 6,824,104 B2 * | 11/2004 | Smallhorn ............... 244/118.5 |
| 7,086,874 B2 * | 8/2006 | Mitchell et al. ............ 439/110 |
| 7,172,155 B2 * | 2/2007 | Feist et al. ............... 244/118.6 |
| 7,188,805 B2 * | 3/2007 | Henley et al. ........... 244/118.5 |
| 7,207,523 B2 * | 4/2007 | Callahan et al. ......... 244/118.6 |

* cited by examiner

*Primary Examiner*—John W Eldred
(74) *Attorney, Agent, or Firm*—Harness, Dickey & Pierce, P.L.C.

(57) ABSTRACT

A system for distributing signals between a first seat and a second seat of a platform. The system generally includes an elongated bus and a connector operable to provide a connection between the bus and the passenger seats. Signals can be transmitted between the bus and the passenger seats, via the connector, at any point along the power bus, thus eliminating the need to run separate connections between the signal source and each seat. The bus is connected to the connector by depressing the bus upon the connector. This system and method significantly reduces the amount of time, energy, and expense necessary to individually wire each passenger seat to receive signals, such as power and/or data.

20 Claims, 6 Drawing Sheets

POWER STRIP FOR SEATS

CROSS-REFERENCE TO RELATED APPLICATIONS

This application claims the benefit of U.S. provisional application Ser. No. 60/556,823 filed Mar. 27, 2004, which is incorporated herein by reference.

The following applications are also incorporated by reference herein: provisional application Ser. No. 60/556,826 filed on Mar. 27, 2004; provisional application Ser. No. 60/557,044 filed on Mar. 27, 2004; provisional application Ser. No. 60/556,747 filed on Mar. 27, 2004; provisional application Ser. No. 60/556,748, filed on Mar. 27, 2004; U.S. application Ser. No. 10/810,324 filed on Mar. 27, 2004; U.S. utility application Ser. No. 10/898,729 filed on Jul. 23, 2004; U.S. utility application Ser. No. 10/936,004 filed on Sep. 8, 2004; U.S. utility application Ser. No. 10/983,906 filed on Nov. 8, 2004; U.S. utility application Ser. No. 10/943,035 filed on Sep. 16, 2004; and U.S. utility application Ser. No. 10/921,553 filed on Aug. 19, 2004.

FIELD OF THE INVENTION

The present invention relates to aircraft electronic systems. In particular, the present invention relates to a power strip that provides current to passenger seats in a mobile platform, such as an aircraft.

BACKGROUND OF THE INVENTION

Commercial aircraft passengers are increasingly demanding in-flight entertainment (IFE) and electrical power outlets to operate various electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed, wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be re-wired so that the wiring will reach the seats in their new positions. As would be expected, re-wiring an aircraft is a costly and time consuming process.

In view of the foregoing, it is desirable to provide an improved device for delivering power to aircraft passenger seat groups that will eliminate the need to separately connect each seat group to an individual power or data cable and the need to re-wire the power cables when the seat configuration is changed.

SUMMARY OF THE INVENTION

A power supply system operable to supply current and/or data to aircraft passenger seats in a mobile platform. The power supply system generally includes a power bus and a connector operable to provide a connection between the power bus and the passenger seats. Power and/or data can be transmitted between the power bus and the passenger seats, via the connector, at any point along the power bus, thus eliminating the need to run separate connections between the power and/or data source and each passenger seat.

In one embodiment, the present invention provides for a system for distributing at least one of data and current between a first point and a second point of a platform. The system comprises an elongated bus and a connector located at at least one of the first point and the second point. The bus extends between the first point and the second point along an upper surface of a floor of the platform. The bus includes a housing that extends at least substantially an entire length of the bus and a conductor operable to conduct at least one of the data and current. The conductor is seated within the housing and extends at least substantially the entire length of the bus. The connector is located at at least one of the first point and the second point. The connector is operable to mate with the conductor to conduct at least one of the data and current between the conductor and the connector. The conductor is operable to mate with the connector at substantially any point along an entire length of the conductor.

In another embodiment, the present invention provides for a system for distributing current in an aircraft passenger cabin to one or more passenger seats. The system includes a source for generating at least one of data and current, an elongated bus, and a connector. The bus extends between the source and the passenger seats along an upper surface of a floor of the passenger cabin. The bus includes a housing that extends at least substantially an entire length of the bus and a conductor that is operable to conduct the at least one of data and current. The conductor is seated within the housing and extends at least substantially the entire length of the bus. The connector is located at a seat leg of the passenger seat. The connector is operable to mate with the conductor to conduct current between the conductor and the connector. The conductor is operable to mate with the connector at substantially any point along an entire length of the conductor.

In still another embodiment, the present invention provides for a method for distributing at least one of data and current between a first point and a second point of a platform. The method includes the step of positioning an elongated bus along an upper surface of a floor of the platform between the first point and the second point. The bus has a housing that extends at least substantially an entire length of the bus and a conductor operable to conduct at least one of data and current. The conductor is seated within the housing and extends at least substantially the entire length of the bus. The method further includes the step of connecting a connector located at at least one of the first point and the second point to the conductor at any point along a length of the bus to conduct at least one of the data and current between the first point and the second point.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
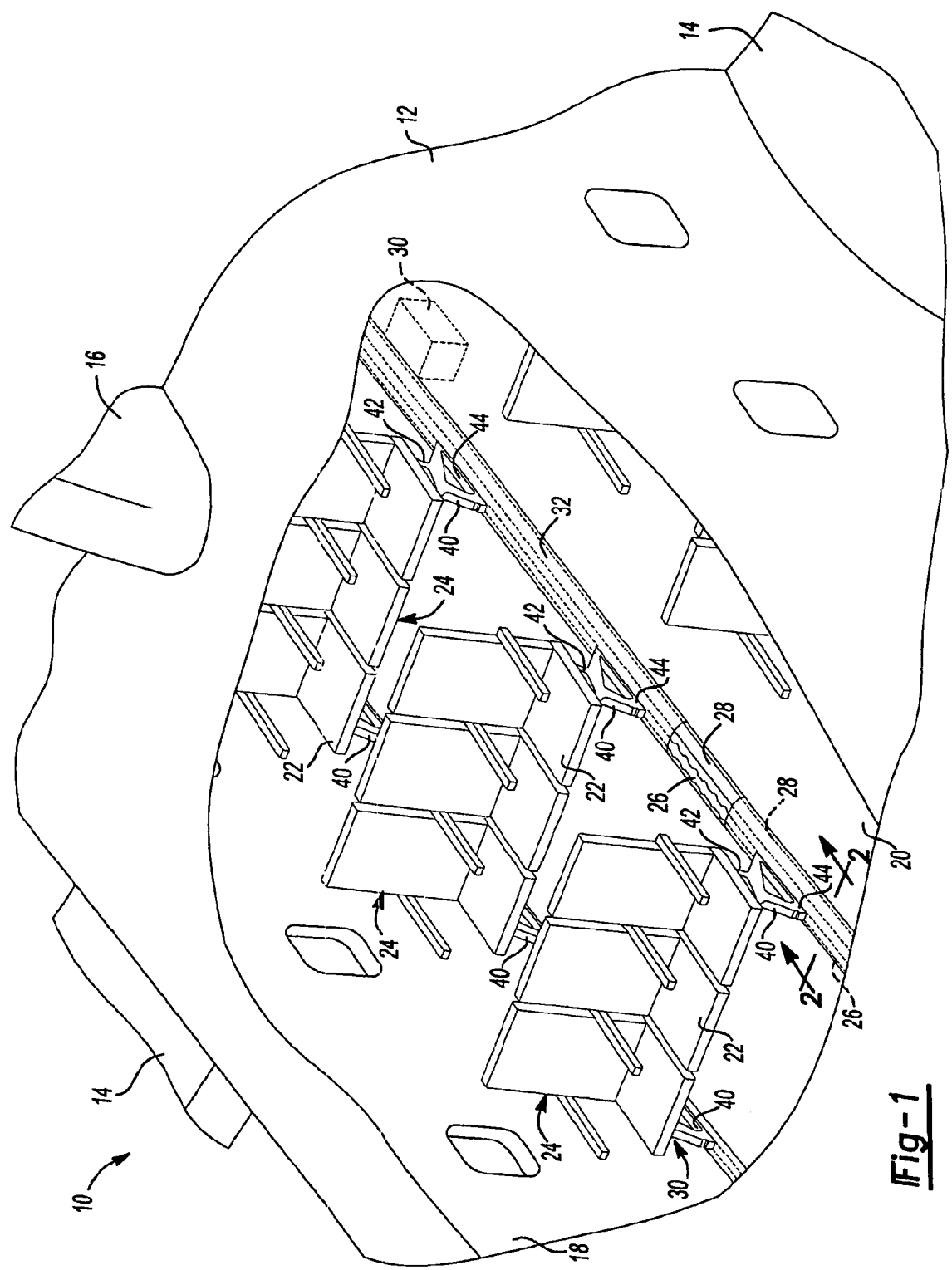
FIG. 1 is a partially cut-away view of an aircraft showing the aircraft passenger cabin outfitted with the power supply system of the present invention.

With initial reference to FIG. 1, a mobile platform in the form of a passenger aircraft equipped with a power distribution system according to the present invention is illustrated at reference numeral 10. It will be appreciated, however, that the present invention is not limited to use only in commercial aircraft and can be implemented in any form of mobile platform, such as a ship, train, bus, motor craft, etc.

The aircraft 10 generally includes a fuselage 12, wings 14, and a tail fin 16. The fuselage 12 includes a passenger cabin 18 having a floor 20. At the floor 20 are numerous passenger seats 22. Two or more passenger seats 22 are grouped together as a seat group 24. One or more seat tracks 26 extend along the floor 20 to secure the seat groups 24 into position. A power bus system 28 for delivering power to the seats 22 extends along side of, or closely adjacent to, one or more of the seat tracks 26. The power bus system 28 connects to a power source 30. The seat tracks 26 and the power bus system 28 are typically covered by a seat track cover 32.

Figure 2:
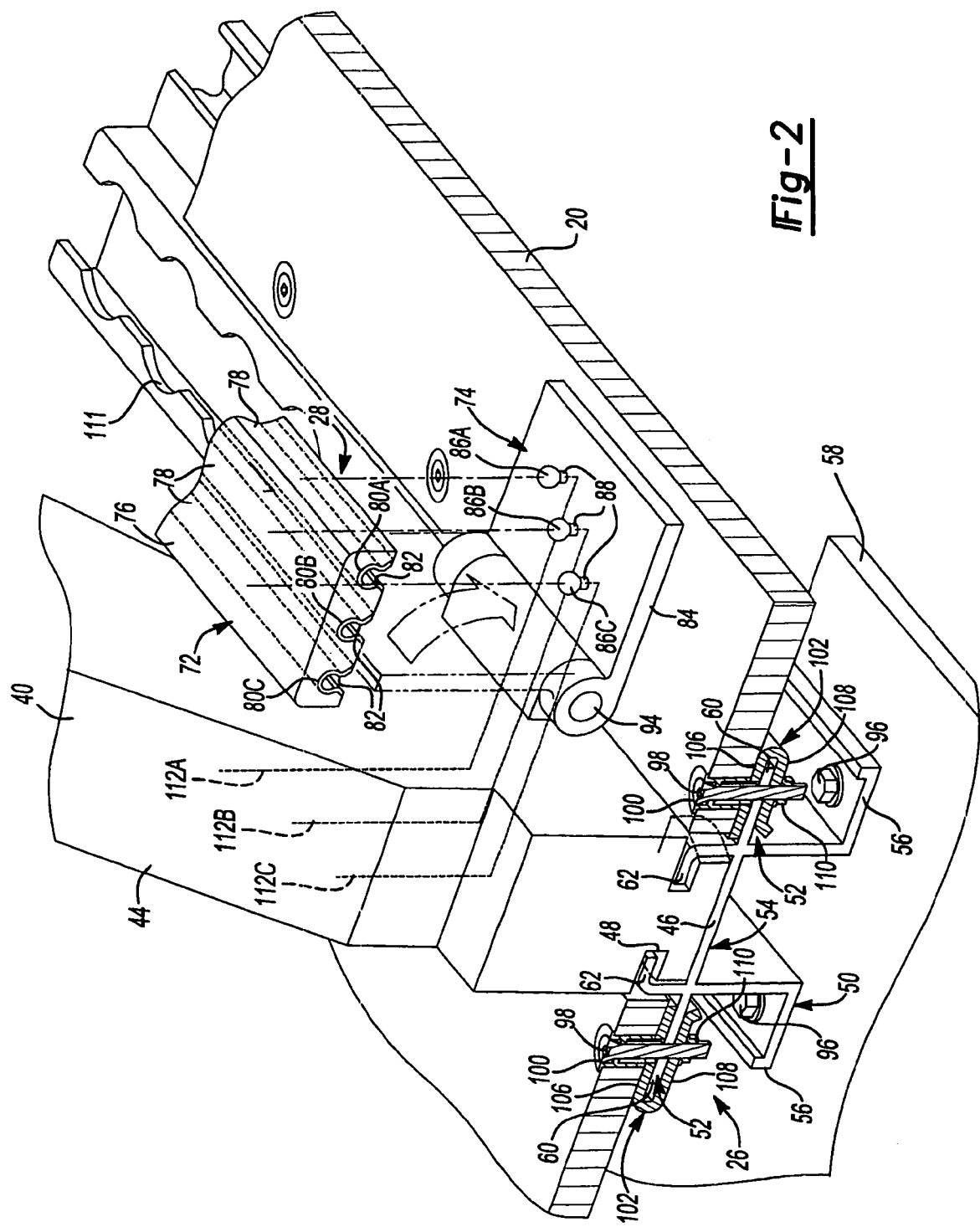
FIG. 2 is a perspective cross-sectional view taken along line 2-2 of FIG. 1 showing a power bus strip contact device of the power bus system in a first position.

With continued reference to FIG. 1 and additional reference to FIG. 2, each seat group 24 includes a frame 34. The frame 34 includes legs 40. The legs 40 provide support to the different passenger seats 22. The legs 40 include an upper portion 42 and a lower portion 44. The upper portion 42 mates with or can be integrated with the seats 22. The lower portion 44 includes a fastening surface 46. The fastening surface 46 can be any conventional fastening device capable of securing the seat group 24 to the seat track 26. For example, the fastening surface 46 can include a tab 48 for cooperating with the seat track 26, as described in further detail below. The tab 48 can be, for example, round, square, or rectangular, to be securely received by the seat track 26.

The seat track 26 has a base portion 50, a floor support 52, and a seat engagement portion 54. The base portion 50 includes one or more extensions 56 to support the seat track 26 on a fuselage floor beam 58. The floor support 52 includes one or more protrusions 60 that protrude from the seat engagement portion 54. The protrusions 60 provide support to the floor 20 in the area proximate to the seat track 26. The seat engagement portion 54 includes two arms 62 for cooperating with and securing the legs 40.

Figure 3:
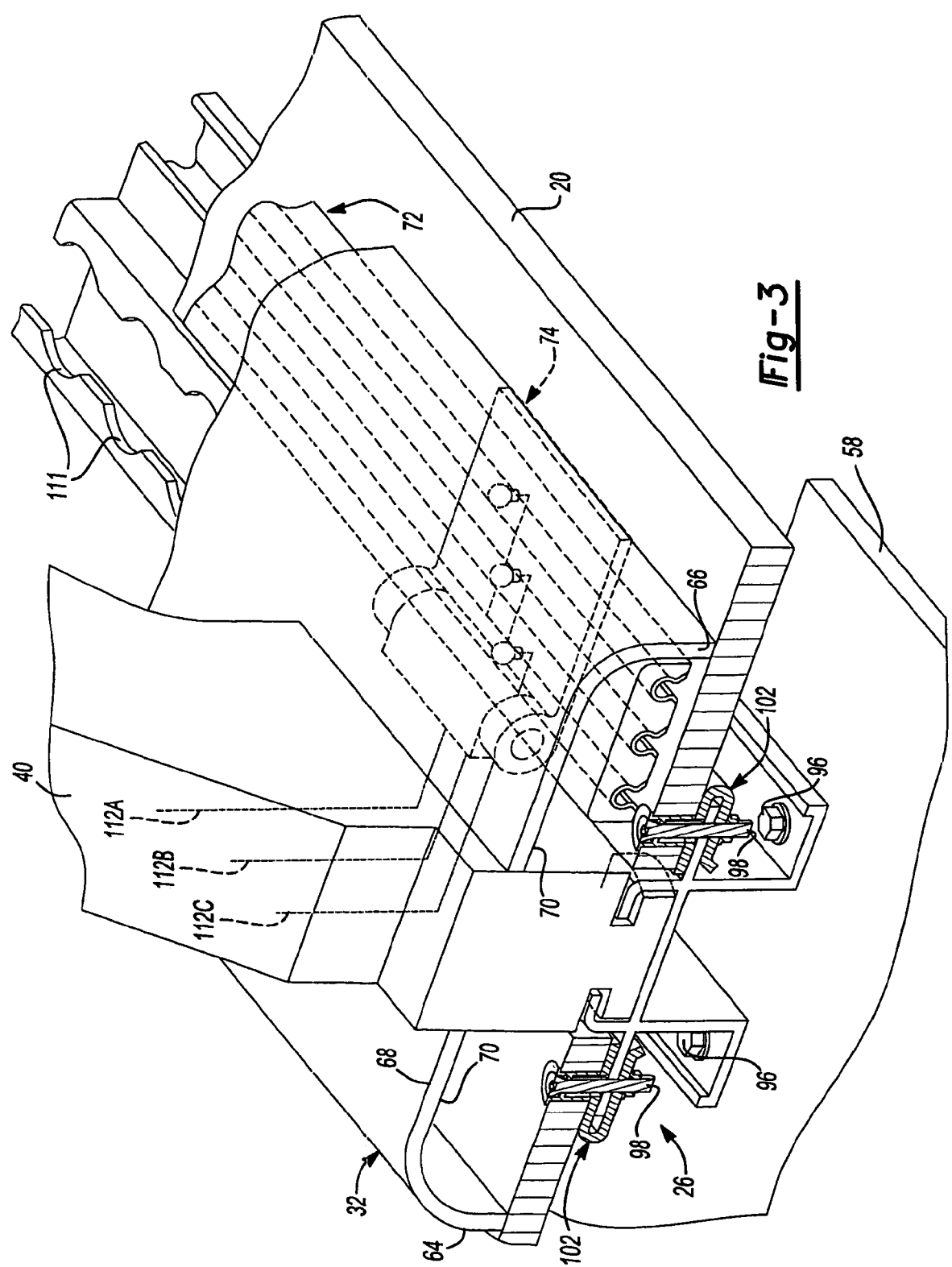
FIG. 3 is a view similar to FIG. 2 showing the power bus strip contact device.

With additional reference to FIG. 3, the seat track cover 32 is an elongated strip for covering the seat track 26 and the power bus system 28. The seat track cover 32 is somewhat semicircular in shape with a first sidewall 64, a second sidewall 66, and a top portion 68. The first sidewall 64 and the second sidewall 66 extend from the top portion 68 generally at an angle, such that when the cover 32 is placed on a flat surface, such as the floor 20 or carpeting of the floor 20, the cover 32 partially defines a cavity 70 between the flat surface and the cover 32.

Figure 4:
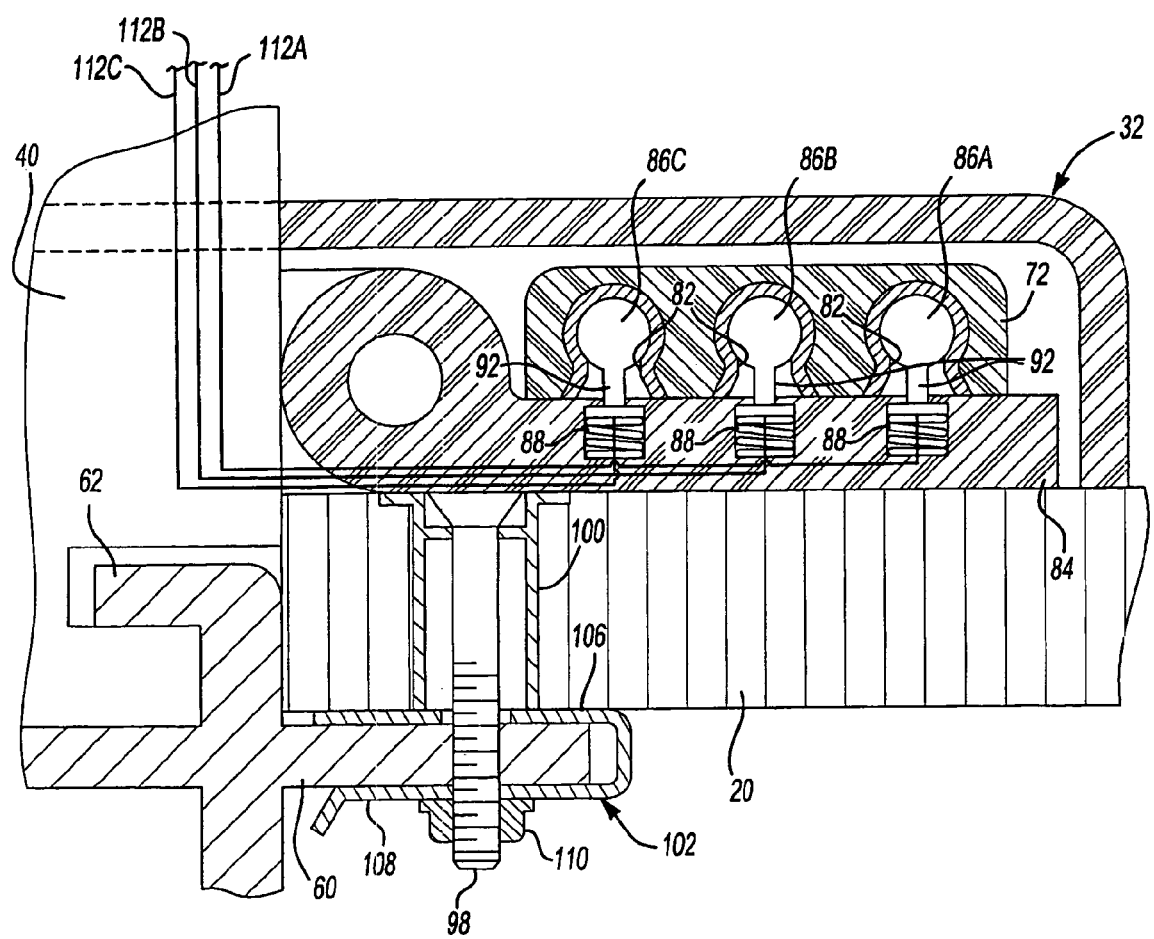
FIG. 4 is an expanded cross-sectional view of the power bus system of FIGS. 2 and 3.

With continued reference to FIGS. 1 through 3 and additional reference to FIG. 4, the power bus system 28 generally includes a power bus strip 72 and a power bus strip contact device 74. The power bus strip 72 generally includes an elongated housing 76 having one or more open receptacles 78. The receptacles 78 extend the entire length of the power bus strip 72. The receptacles 78 include a conductor 80, such as copper. The conductor 80 extends the entire length of the power bus strip 72 and/or the entire length of the receptacles 78. The receptacles 78 can be numerous different shapes and sizes and can include a locking detail 82. The housing 76 can be made of numerous conventional materials, but is typically made of a resilient material, such as rubber. The receptacles 78 can be formed within the housing 76 itself or can be formed as a separate component that is inserted within the housing 76.

As illustrated, the housing 76 includes a first conductor 80A in communication with the power source 30 to carry power from the power source 30, a second conductor 80B that is in communication with the power source to return power to the power source 30, and a third conductor 80C to ground the power bus 28 by connecting to a suitable ground surface at any point along the strip 72. The power source 30 can be a dedicated battery for supplying power to the passenger seats 22 or can be connected to the general aircraft power supply. The power source 30 can include electrical contacts (not shown) that make electrical contact with the conductor 80A to transfer electricity to the conductor 80A. The number of conductors 80 and their function may vary depending on the application. To make the conductors 80 more flexible for transportation and installation, the conductors 80 can be at least partially slit across at least a portion of their length.

The power bus contact device 74 includes a base 84 and one or more contacts 86. In some applications the base 84 can be a generally rigid, rectangular foundation upon which the contacts 86 are rigidly mounted. The contacts 86 can be directly mounted to the base 84 or can be mounted upon spring supports 88 to bias the contacts 86 such that the contacts 86 extend outward from the base 84. The contacts 86 can be of any suitable shape or size and of any suitable material, such as copper. To cooperate with the receptacles 78, the contacts 86 are typically shaped and sized in a manner that mirrors the shape and size of the receptacles 78. For example, the contacts 86, as illustrated in FIGS. 2 through 4, have a round head 90 supported by a stem 92. The shape of the head 90 approximates the interior shape of the receptacles 78 and permits the locking detail 82 to lock around the head 90. Other shapes and configurations that can be used by the receptacles 78 and the contacts 86 include, but are not limited to, a Christmas Tree fastening system, an over-center fastening system, and a pitchfork fastening system. As illustrated, the contacts 86 include a first contact 86A, a second contact 86B, and a third contact 86C. However, the number of contacts and their function can vary depending on the application.

The power bus contact device 74 can be separate from the seat leg 40 or can be secured to the seat leg 40 via a suitable fastening device, such as a hinged fastening device 94. The seat leg 40 can be manufactured to include the power bus contact device 74. Alternatively, conventional seat legs 40 without the contact device 74 can be retrofitted to include the contact device 74 secured to the leg 40. The hinged fastening device 94 permits the power bus contact device 74 to pivot between a retracted position in which the contact device 74 is vertical and parallel to the seat leg 40 (FIG. 2), and an extended position in which the power bus contact device 74 extends from the seat leg 40 at approximately a right angle to a vertical portion of the leg 40 (FIG. 3). In addition to the hinged fastening device 94, any other suitable fastening device can be used, such as a rotational fastening device (not shown) in which the power bus contact device 74 rotates from the seat leg 40 in the same plane as the floor 20 as it is moved from the retracted position to the extended position (FIG. 3).

Figure 5:
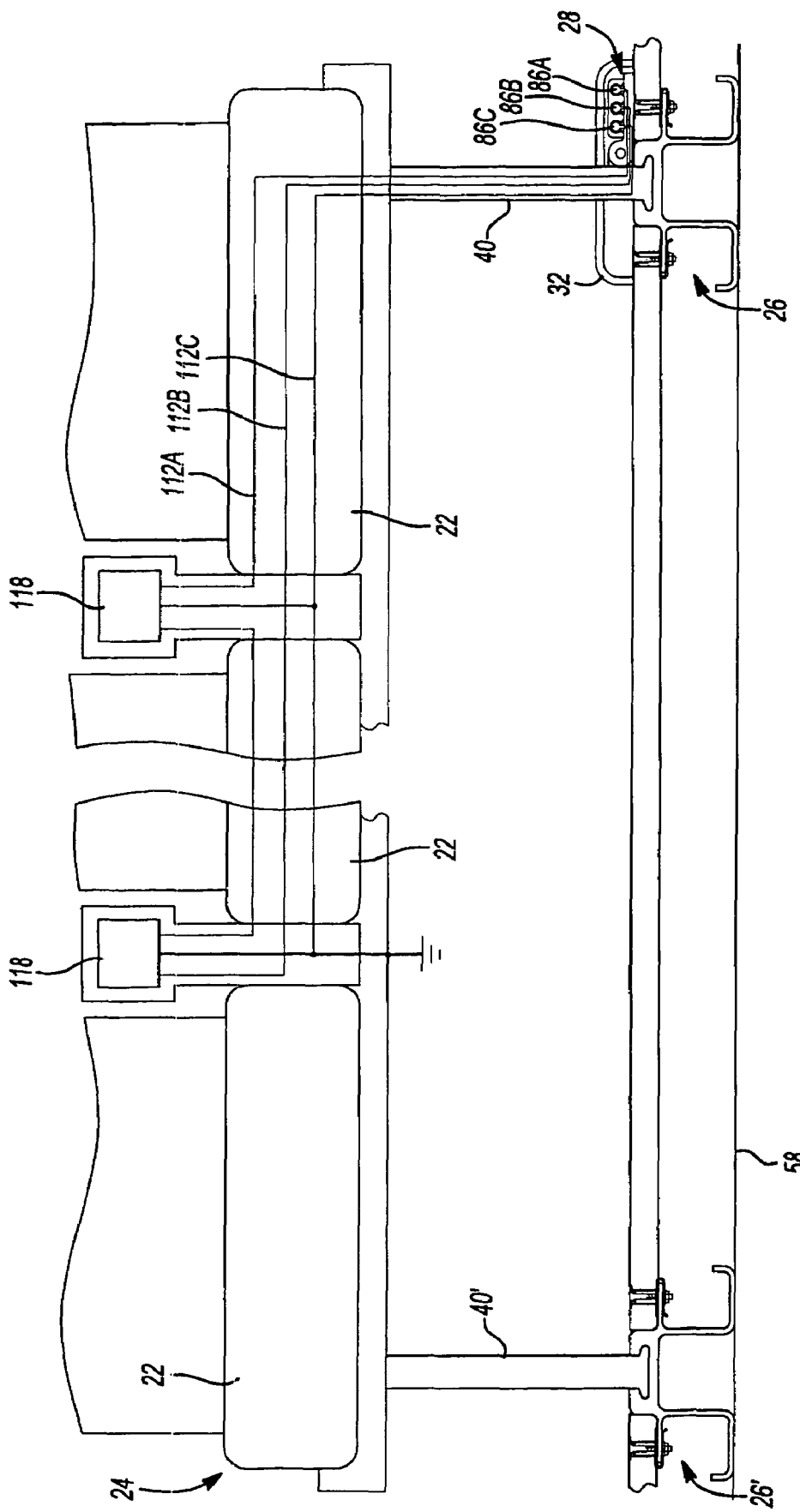
FIG. 5 is a schematic view illustrating an exemplary wiring configuration of the present invention.

With additional reference to FIG. 5, one or more wires 112 extend from the contacts 86 through both the base 84 and the seat legs 40 to the seats 22. As illustrated, a first wire 112A is in electrical connection with the first contact 86A, a second wire 112B is in electrical contact with the second contact 86B, and a third wire 112C is in electrical contact with the third contact 86C. In addition to this configuration, the third wire 112C can extend down the seat leg 40' opposite the seat leg 40 near the power bus 28 to ground the seat group 24 and the power bus 28 at the seat track 26'.

The cooperation of the above components and their operation will now be described in detail. The seat track 26 is generally positioned just beneath or at the surface of the floor 20 and extends the length of, or at least a portion of the length of, the passenger cabin 18. Portions of the floor 20 are removed just above the seat track 26 to permit access to the seat track from the passenger cabin 18. The aircraft can include any number of seat tracks 26 depending on the application. In some applications, two seat tracks 26 are provided to support each seat group 24 at the floor 20.

The seat track 26 is typically held in position by securing the extensions 56 to the floor beam 58 of the fuselage 12. The extensions 56 are secured to the floor beam 58 in any suitable manner, such as using an adhesive or a fastener, such as a bolt 96 extending through the extensions 56, at numerous positions along the length of the seat track 26. With the seat track 26 secured into position below the floor 20, the floor support 52 provides support to the portions of the floor proximate to the seat track 26.

To further secure the seat tracks 26 into position, additional fasteners can be used along the length of the seat track 26, such as a flush mounted screw 98, to secure the protrusions 60 of the floor support 52 to the floor 20. Specifically, an insert 100 can be positioned within the floor 20 to receive the flush mounted screw 98, which further extends through the protrusions 60. A clip-nut 102 is typically used to secure the flush mounted screw 98 to the protrusions 60. The clip-nut 102 includes a top portion 106 and a bottom portion 108. The top portion 106 includes an aperture for receiving the flush mounted screw 98 and the bottom portion 108 includes a conventional lock-nut 110 that is held captive within the bottom portion 108. The clip-nut wraps around the protrusion 60 such that the top portion 106 is at an upper surface of the protrusion 60 and the bottom portion 108 is at a lower surface of the protrusion 60. To secure the protrusion 60 to the floor 20, the flush mounted screw 98 is inserted through the insert 100, through the top portion 106 of the clip nut 102, through the protrusion 60, and through the bottom portion 108 where it cooperates with the lock-nut 110 to hold the flush mounted screw 98 into position to fasten the floor 20 to the protrusions 60 of the floor support 52.

With the seat tracks 26 secured in position, the seat groups 24 containing the passenger seats 22 are be installed. The seat groups 24 are positioned above the seat tracks 26 such that the legs 40 of each seat group are aligned with the seat tracks 26. Generally, the fastening tab 48 of the seat legs 40 is, at its widest point, wider than the distance between the arms 62 of the seat engagement portion 54 of the seat track. However, at various apertures along the length of the seat track 26, the distance between the arms 62 increases to permit passage the tab 48. It is at these regions that the fastening tab 48 is inserted past the arms 62 to within the seat engagement portion 54. The seat group 24 is then moved along the seat track 26 such that the tab 48 is moved to a point in the seat track 26 where the distance between the arms 62 is less than the width of the tab 48 to lock the tab 48, and thus the seat group 24, to the seat track 26. To insure that the tab 48 does not return to the area of the seat track 26 where the distance between the arms 62 is widened, the seat leg 40 is be secured into position along the seat track 26 in any conventional manner, such as by a bolt.

The power bus contact device 74 is positioned at or proximate to the leg 40 either before or after the legs 40 of the seat groups 24 are secured to the seat tracks 26. If the seat leg 40 is manufactured to include the power bus contact device 74, the device 74 can be rotated, for example, via the hinged fastening device 94 to an extended position in which the device 74 extends from the leg 40 approximately parallel to the floor 20 and approximately perpendicular to the leg 40. In this extended position the device 74 places the contacts 86 in a position in which they are operable to make electrical contact with the power bus strip 72. If the device 74 is not secured to the leg 40, the passenger cabin 18 can be retrofitted with the device 74 by manually placing the device 74 at or proximate to the leg 40. The device 74 can be placed directly on the floor 20, or carpeting covering the floor, using a suitable adhesive or a hook and loop fastening system, such as Velcro®, in which the hook portion is provided on an undersurface of the power bus contact device 74 and the loop portion is provided by the carpeting itself.

The power bus strip 72 is extended across numerous contact devices 74 of different seat groups 24. Specifically, the power bus strip 72 is positioned atop the contact device 86 such that the conductor 80A connects to the contact 86A to transfer power to the wire 112A, the conductor 80B connects to the contact 86B and the wire 112B to provide a power return to the power supply 30, and the conductor 80C connects to the contact 86C and the wire 112C to provide a ground. As seen in FIG. 5, the energized wire 112A is used to transfer power to an outlet 118, or other electrical device(s) of the seat group 24 with the wire 112B serving as the return and the wire 112C serving as the ground to the frame 34.

Finally, the seat track cover 32 is inserted over the seat track 26 and the power bus 28. To accommodate the seat legs 40, a section of the top portion 68 of the cover 32 is removed. The seat track cover 32 is secured to the floor 20 using any suitable adhesive or mechanical fastening device.

Figure 6:
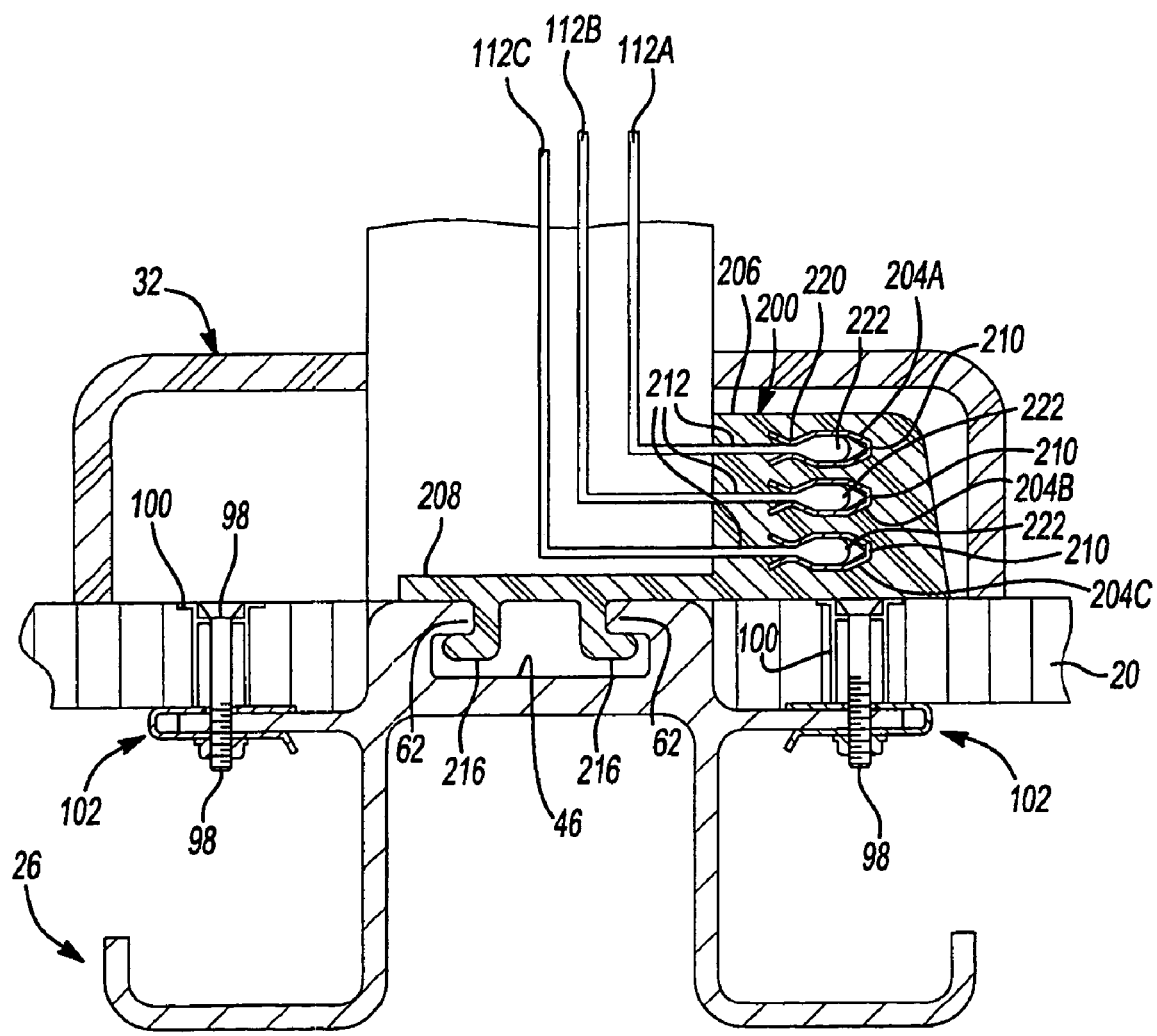
FIG. 6 is cross-sectional view of an alternative embodiment of the present invention.

FIG. 6 illustrates an additional embodiment of the power bus system of the present invention at 200. Because this embodiment includes numerous elements similar to the elements described above, the same reference numbers are used to describe these like elements. Further, the above description applies to these like elements and the operation of the embodiment of FIG. 6

The power bus system 200 generally includes a power bus housing strip 202 and one or more power bus conductor strips 204. The power bus housing strip 202 generally includes a housing strip body 206 and a housing strip extension flap 208. The housing strip 202 is generally an elongated strip that extends approximately the length of the passenger cabin 18, or the length of any desired "zone" of the passenger cabin 18. The housing strip body 206 includes a cavity 210 and a slit or inlet 212 that permits access to the cavity 210. The extension flap 208 extends from the body 206 and generally includes a cover 214 and a clip 216 extending from an undersurface of the cover 214. The clip 216 is configured to cooperate with the fastening surface 46 of the seat track 26 and secure the cover 214 to the seat track 26. The body 206 and flap 208 can be made of a flexible material, such as a polymeric material to allow the flap 208 to snap within the seat track 26.

The power bus conductor strip 204 is typically located within the cavity 210. The conductor 204 includes an open-ended aperture 218 and a locking detail 220. The conductor 204 can be made of a conductive material, such as copper. As illustrated, the housing 202 includes a first conductor 204A that is in contact with the power supply 30 to conduct power through the housing 202, a second conductor 204B that serves as a power return back to the power supply 30, and a third conductor 204C that is in communication with any suitable ground surface to ground the power bus system 200. When the power bus system 200 is fully assembled, as in FIG. 6, the first conductor 204A is in contact with the wire 112A to direct power through the wire 112A, the second conductor 204B is in contact with the wire 112B to receive power returned through the wire 112B, and the third conductor 204C is in contact with the wire 112C to ground the seat group 24 and the power bus system 200. Contact between the conductors 204 and the wires 112 is provided by connectors 222. To make the conductor 204 more flexible for transportation and installation, the conductor 204 can be at least partially slit across at least a portion of its length. In some embodiments the connectors 222 can rigidly extend from the seat leg 40.

The power bus system 200 is particularly useful for retrofitting an aircraft passenger cabin 18 with a power supply system, however, the power bus system 200 may also be used in the assembly of a new aircraft before or after the passenger seats 22 are installed. When used as a retrofit device, the existing seat track cover (not shown) of the aircraft is removed to expose the seat track 26. The clip 216 is inserted within the seat track 26 such that the cover 214 is secured at the top of the seat track 26 and the power bus housing strip 202 is secured along side of the seat track 26. Portions of the cover 214 are removed at the seat legs 40 to permit the power bus system 200 to extend past the seat legs 200. The plugs are then inserted within the conductors 204A, 204B, and 204C, to provide contact with the wires 112A, 112B, and 112C respectively.

It must be noted that while the power bus system 28 and power bus system 200 are described as distributing power to the passenger seats 22, the systems 28/200 can also be used to distribute data to the passenger seats 22. For example, data distribution can be performed using conventional communication over power line systems.

It must also be noted that the passenger cabin 18 can be outfitted with multiple power bus systems 28/200 at each seat group 24. The multiple power bus system(s) 28/200 can be provided at the same seat track 26 or different seat tracks 26. The use of multiple power bus systems 28/200 is useful to provide separate power bus systems for both power and data. Further, a first power bus system 28/200 at the seat track 26 can be used for current delivery and a second power bus system 28/200 can be used as a current return. Still further, the use of a second power bus system 28/200 can be used to supply additional current to the seat groups 24.

The power bus systems 28/200 can also include a data only optical strip (not shown) housed within either the housing 76 or the body 206 of the power bus systems 28/200 respectively. The optical strip can be any conventional optical data line. For example, the optical strip can be made by co-extruding opaque plastic over clear plastic to make a light guide. High-bandwidth data can be sent to the seat groups 24 using conventional "lightguide" technology, or any other short-range fiber optic technology. This high-bandwidth data is received by each seat group 24 and each seat 22 by a conventional high-bandwidth receiver or connector.

The power bus systems 28/200 can further include a data strip (not shown) that carries both optical data and electrical current. For example, a clear plastic with sufficiently high dielectric to insulate a power conductor, such as polyethylene, can be co-extruded around one or more of the conductors 80/204 with a clear plastic interior and an opaque plastic exterior. Data can be transmitted through the plastic portion using, for example, conventional "lightguide" technology or any other short-range fiber optic technology, and electrical current can be conducted through the conductors 80/204. By adding a conventional optical tap (not shown) to either the contacts 86 or connectors 222 of the power bus systems 28/200 respectively, a single conductor 80/204 can be used to transmit both power and optical data.

In another embodiment of the power bus system 200, the connectors 222 are mounted on the floor 20 of the aircraft 10 such that the connectors 222 face upward and away from the floor 20. Further, the inlet 212 of the cavity 210 extends downward toward the floor 20. In this configuration, the connection between the connectors 222 and the cavity 210 is made when the body 206 of the power bus housing 202 is laid along the passenger cabin floor 20. This embodiment eliminates the need to manually insert each connector 222 within the cavity 210.

In still another embodiment, the power bus systems 28/200 are arranged such that the power bus strip 72 or the housing strip body 206 extend between the seat legs 40 at or within the seat tracks 26. For example, the contacts 86 of the power bus system 28 and the connectors 222 are positioned at both ends of the legs 40 in the power bus systems 28/200 respectively. The power bus strip 72 and the body 206 extend between the legs and between the seat groups 24 so that the energized conductors 80 mate with the contacts 86 and the conductors 204 mate with the connectors 222 to provide power and/or data to the seats 22. By only running the power bus strip 72 and the housing strip body 206 between the seat legs 40, the continuous lump besides the seat tracks 26 created by running the power bus strip 72 or the housing strip body 206 continuously along the floor 20 is eliminated.

The present invention, while being especially well suited and advantageous for use on mobile platforms, could also just as easily be implemented in a fixed structure having a plurality of items requiring electrical power and/or data. Such an implement would also significantly reduce the complexity of the cabling and connectors needed to supply power and/or data lines to the different items.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for distributing signals between a first seat and a second seat of a platform comprising:
    an elongated bus extending between said first seat and said second seat along an upper surface of a floor of said platform including:
        a housing that extends at least substantially an entire length of said bus;
        a conductor for conducting signals, said conductor seated within said housing and extending at least substantially the entire length of said bus; and
    a connector of a seat subsystem located at and extending from at least one of said first seat and said second seat, said connector operable to mate with said conductor to conduct the signals between said conductor and said connector;
    wherein said bus mates with said connector by positioning said bus over said connector and depressing said bus against said connector;
    wherein said conductor is operable to mate with said connector at substantially any point along an entire length of said conductor.

2. The system of claim 1, wherein said platform is an aircraft.

3. The system of claim 1, wherein said connector includes a contact mounted on a spring.

4. The system of claim 1, wherein said connector is mounted to a base that is hingedly mounted to at least one of said first and said second seat leg.

5. The system of claim 1, wherein said housing is mounted to a seat track of said passenger cabin.

6. The system of claim 1, wherein said connector is a cable that extends from said seat.

7. The system of claim 1, wherein said bus conducts data using fiber optic technology.

8. The system of claim 5, wherein said housing is made of a flexible material.

9. A system for distributing signals in an aircraft passenger cabin to one or more passenger seats comprising:
    a source for generating said signals;
    an elongated bus extending between said source and said passenger seats along an upper surface of a floor of said passenger cabin, said bus having:
        a housing that extends at least substantially an entire length of said bus;
        a conductor operable to conduct said signals, said conductor seated within said housing and extending at least substantially the entire length of said bus; and
    a connector mounted to and rigidly extending from a seat leg of said passenger seat, said connector operable to mate with said conductor to conduct current between said conductor and said connector;
    wherein said bus mates with said connector by positioning said bus over said rigid connector and depressing said bus against said connector so that said conductor receives and substantially surrounds said connector;
    wherein said conductor is operable to mate with said connector at substantially any point along an entire length of said conductor.

10. The system of claim 9, where said source is a fiber optic source.

11. The system of claim 9, wherein said connector includes a contact mounted on a spring.

12. The system of claim 9, wherein said connector is mounted to a base that is hingedly mounted to said seat leg.

13. The system of claim 9, wherein said housing is mounted to a seat track of said passenger cabin.

14. The system of claim 9, wherein said housing comprises a dielectric material.

15. A method for distributing signals between a first point and a second point of an aircraft passenger cabin:
    positioning an elongated bus along an upper surface of a floor of said cabin between the first point and the second point, the bus having:
        a housing that extends at least substantially an entire length of the bus;
        a conductor operable to conduct the signals, the conductor seated within the housing and extending at least substantially the entire length of the bus;
    connecting a connector located at at least one of the first point and the second point to the conductor at any point along a length of the bus to conduct the signals between the first point and the second point by maneuvering the bus and depressing the bus against the connector.

16. The method of claim 15, said positioning step further comprises positioning the bus along a floor of the cabin between a signal source and a passenger seat.

17. The method of claim 16, wherein the source generates fiber optic signals and the bus is operable to distribute the fiber optic signals.

18. The method of claim 15, said connecting step further comprises connecting the power bus to the connector supported by a spring.

19. The method of claim 15, said positioning step further comprises securing the bus to a seat track.

20. The method of claim 15, said positioning step further comprises securing the bus to a rigid connector extending from the seat leg.

* * * * *